Patented Feb. 22, 1944

2,342,196

UNITED STATES PATENT OFFICE 2,342,196

CATALYST MANUFACTURE

Hurshel V. Hendrix and Charles C. Chapman, Oklahoma City, Okla., assignors to Phillips Petroleum Company, a corporation of Delaware No Drawing. Application December 21, 1940
Serial No. 371,209

7 Claims. (Cl. 252—236)

This invention relates to the preparation of catalytic materials, and it deals more particularly with catalysts of the silica-alumina type comprising or consisting of silica and an oxide of a metal selected from the aluminum sub-group of group III or from the titanium sub-group of group IV of the periodic table, and with the preparation and use of such catalysts. It relates more particularly to a silica-alumina catalyst suitable for polymerization of low-boiling olefin hydrocarbons, and for cracking and dehydrogenation of hydrocarbons.

A catalytic material of the past can, as a rule, be placed in one of two broad groups: (1) a catalytic material which has substantially the same composition throughout such as nickel, chromium oxide gel, intimate mixtures of two or more materials such as dried mixtures of precipitated hydrous metal oxides and the like, and (2) a catalytic material comprising a support which has deposited on it or impregnated in it a material which is catalytic or which can be treated to make it catalytic, the support at times acting merely as an inert material but often apparently acting as a promoting agent as well. A third type of catalytic material has recently come into importance which, although it apparently might be a member of the second group just mentioned, can be distinguished from the members of this group. In the preparation of this latter type of catalyst, an acid hydrogel such as a silica gel is first prepared, and before it is thoroughly dried or dehydrated it is treated with an aqueous solution of a suitable metal salt. While the resultant product, after washing and drying, appears to consist of or comprise a mixture of silica and an oxide of the metal of the metal salt solution, nevertheless, this product has not been prepared by precipitating a metal hydroxide or hydrous oxide upon an inert support, nor has a dried, inert support been impregnated with a metal salt which has been decomposed or from which a decomposable compound has been precipitated, as when thoroughly dried pumice or silica gel has been impregnated with aluminum nitrate and the resultant material calcined, or treated to precipitate aluminum as the hydroxide or carbonate or the like and subsequently calcined. Such catalytic materials comprising silica and various metal oxides have been described by Gayer (Industrial and Engineering Chemistry, 25, 1122), Perkins et al. (U. S. Patent No. 2,107,710), McKinney (U. S. Patents Nos. 2,142,324 and 2,147,985) and Fulton and Cross (U. S. Patents Nos. 2,129,649; 2,129,732 and 2,129,733). It is with such catalysts of the silica-alumina type that our invention is more particularly concerned.

In general, catalysts of the latter or third type are prepared by first forming a hydrous silica gel or jelly from an alkali-metal silicate and an acid, washing soluble material from the gel, treating or activating the gel with an aqueous solution of a suitable metal salt, and subsequently washing and drying the treated material. In this manner, a part of the metal, presumably in the form of a hydrous oxide or loose hydroxide compound formed by hydrolysis, is selectively adsorbed by the hydrous silica, and is not removed by subsequent washing. This selective adsorption is attested by a decrease in the metal content of the activating solution as well as a decrease in pH as the activation progresses. The most often used catalyst of this type, at present, is a silica-alumina catalyst, prepared by treating a wet or partially dried hydrous silica gel with an aluminum salt solution, such as a solution of aluminum chloride or sulfate, and subsequently washing and drying the treated material. However, catalysts of a very similar nature but differing among themselves as to one or more specific properties, may be prepared by using, instead of an aluminum salt, a hydrolyzable salt of a metal selected from group III-B or from group IV-A of the periodic system, and may be referred to in general as catalysts of the silica-alumina type. More particularly, salts of indium and thallium in addition to aluminum in group III-B may be used, and salts of titanium, zirconium and thorium in group IV-A may be used to treat silica gel and to prepare catalysts of this general type. Boron in the form of boric acid, or a soluble borate such as sodium borate, may be incorporated with the silica gel. The catalysts so prepared are useful in processes for the polymerization of unsaturated organic compounds, especially for the polymerization of low-boiling olefin hydrocarbons in either gaseous or liquid phase, for the depolymerization of higher-boiling polymers, for the cracking and splitting of higher-boiling hydrocarbons to form lower-boiling hydrocarbons, for the reforming of gasoline and naphtha stocks, for the hydrolysis of alkyl and aryl halides at elevated temperatures, for the addition of certain halogens and hydrogen halides to unsaturated compounds, for the splitting out of a hydrogen halide from an alkyl halide, and the like. Whether prepared by this method or by some modification thereof, the catalyst will contain a major portion of silica and a minor portion of metal oxide. This minor portion of metal oxide, such as alumina, will generally not be in excess of 10% by weight, and will more often, and generally more preferably, be between about 0.1 and 1.5 or 2% by weight.

We have found that improved catalysts of the silica-alumina type of higher average activity and with more uniform activity can be prepared by conducting the activation treatment with a flowing stream of activating solution, and especially with a flowing stream which is recirculated, at least in part, over the mass of material being activated. We have also found that the manner of conducting the washing operation which follows the activation treatment in the usual preparation of catalysts of the silica-alumina type has a pronounced effect on the subsequent activity of the catalyst, and that catalysts of higher and more uniform activities are consistently prepared if the washing is conducted not by simply passing a stream of water through a mass of activated silica gel, but by so operating that a substantial portion of the effluent wash water is recirculated over the material being washed. In this procedure, a portion of the effluent wash water is discarded and a further portion is admixed with fresh wash water and the resultant mixture is passed over the material being washed.

It is an object of this invention to provide a process for the preparation of catalysts of the silica-alumina type.

Another object of this invention is to provide a process capable of producing numerous batches of catalysts of the silica-alumina type with high and relatively uniform activity both between and among catalyst batches.

A further object of our invention is to provide processes for the preparation and use of catalysts comprising a major portion of silica and a minor portion of an oxide of a metal selected from groups III-B and IV-A of the periodic system.

Still another object of our invention is to provide a process for the preparation of successive batches of a catalyst of high activity comprising a major portion of silica and a minor portion of alumina obtained by hydrolytic adsorption of alumina on silica gel.

Other objects and advantages of our invention will be apparent from the accompanying description.

The silica gel which forms a part of a catalyst of the silica-alumina type as herein discussed is preferably prepared by reacting an aqueous alkali-metal silicate, such as sodium silicate or water glass, with an acid and allowing the resultant mixture to set to a highly hydrous gel. This is preferably accomplished by pouring a dilute aqueous silicate solution into a dilute aqueous solution of a mineral acid, such as hydrochloric or sulfuric acid, or as described in the McKinney Patent No. 2,147,985, into phosphoric acid, at a temperature approximately atmospheric and with thorough agitation or stirring. Soon after the mixing is complete the resultant material will set to a gel or jelly which is highly hydrous, and which is preferably allowed to stand for several hours, generally about 12 to 16 being sufficient. The gel is then broken up, preferably by forcing it through a coarse screen such as a screen with holes approximately one inch in diameter, and the major proportion of the free acid is washed or rinsed away. If natural waters are used, they should generally be free of iron. The gel material is then partially dried, preferably to a water content of about 45 per cent, and it is again washed, the washing being continued until the pH of the effluent wash water is about 2.0 to 2.5 or more.

In realizing the fullest benefits of our invention, this washing step is carried out by placing the granular, partially dried gel in a suitable large tank or vat, filling the tank with water, removing from the tank a stream of water, adding fresh water to the tank at substantially the same rate as water is so removed, and also withdrawing another stream of water and returning it to the tank in a manner such that there is a more or less constant and continuous flow of water through the mass of gel contained therein. One method of accomplishing this is to add water at the top of the tank, withdraw water from the bottom of the tank, and return a substantial portion of the water so withdrawn to the top of the tank, discarding the remainder. This recirculation of water may be accomplished by any suitable pumping means. While we have practiced this recirculation by using an ordinary small pump, the simplest and most effective means we have employed in actual practice to recirculate the water has been a steam jet. To this jet was supplied water from the bottom of the tank in one or more streams and fresh water in another stream, the combined streams being forced by the jet to the top of the tank. Water was discharged from the system through an overflow at the top of the tank. In such a washing operation, the amount of fresh water added to the system should be between about 0.25 and 2.5 volumes of fresh water per volume of gel being washed per hour, and the ratio of the amount of recirculated water to fresh water should be between about 1:1 and 10:1. This washing may be carried out at about atmospheric temperature. However, the desired extent of washing, as indicated generally by the pH of the effluent wash water, is somewhat more quickly obtained at slightly elevated temperature, although it is not necessary to use boiling hot wash water.

After this washing is completed, the water is drained from the tank and a solution of a suitable hydrolyzable salt of a metal of group III-B or IV-A, as previously described, is added to the tank until the solution level is above the catalyst mass. This solution is preferably free of iron and other contaminants of like nature, and should have a strength of about 0.05 to 1.0 molar. In the practice of our invention, the activation of the silica gel with this solution is carried out with a recirculation of the solution in a manner similar to the recirculation of the wash water, that is, a stream of the solution is removed from the tank at one point and returned to another point in a manner such as to set up a general flow through the entire catalyst mass. While a portion of the activating solution may be discharged, being replaced by fresh activating solution, this is not necessary in most instances. The activation is preferably carried out at an elevated temperature, at or near the ordinary boiling temperature of the solution. Although even higher temperatures may be used, in a closed system under suitable pressure, the added expense for pressure equipment and operation generally does not make this worth while. The heating and maintenance of a suitable activating temperature may be carried out by any suitable means, such as by passing steam through coils in the tank and/or direct injection of steam. The use of a steam jet to circulate the activating solution has the added advantage of supplementing the supply of heat to the system. However, excessive dilution by directly injected steam is to be avoided.

The activation treatment should be carried out for an appreciable period, such as about 20 or 30 minutes to several hours, during which time the concentration of the metal of the metal salt used and the pH of the treating solution decrease. We have found that an activating period of about two hours is suitable for the preparation of a silica-alumina catalyst for olefin polymerization and longer or shorter times may be used, as may be readily determined by trial for any particular applications of our invention.

After the gel has been treated, or activated, it must be washed. This can be done by draining off the activating solution and washing the activated gel without removing it from the tank. Improved results are obtained if this washing is also carried out with a flow of water through the catalyst mass and a recirculation of a portion of the effluent wash water, as previously described for the washing carried out prior to the activation. The wash water, in this instance, is likewise generally near or only somewhat above ordinary atmospheric temperature, although higher temperatures may be used. This washing is continued until the effluent wash water is substantially free or anions of the salt used in the activating solution. A suitable method of control of this washing operation may also be based on the pH of the wash water, the washing being continued until the pH is of a value within the range of about 3 to 5, preferably 3.5 to 4.5. In any event, the pH should not be allowed to exceed about 6.5 or 7.0.

After this washing has been completed, the wash water is removed from the treated gel. The gel is then dried and is ready for use as a catalyst. This drying step should not be carried out at too high an elevated temperature. If it is dried at a low temperature, below about 225° F., as disclosed in the copending application of K. H. Hachmuth, Serial No. 370,558, filed December 17, 1940, it will initiate a desired polymerization of low-boiling unsaturates at a low temperature. However, if it is dried and heated to a temperature of the order of 660 to 1020° F., although in most cases preferably below 850° F., the catalyst will not initially be quite so active in the polymerization of olefins but will have a greater activity than otherwise after having carbonaceous contaminants removed by a "burning-off" step. This advantage may in many instances offset a somewhat lessened initial activity. However, such a catalyst of the silica-alumina type is generally definitely injured as to any catalytic activity for ordinary reactions below about 800 to 950° F. if it is heated above about 1020° F.

Although in some cases a more active catalyst results if this treated gel is again treated with a fresh portion of activating solution, preferably but not necessarily after the once-treated catalyst has been washed as described, and either with or without intermediate drying, such a multiple activation is not necessary in all cases. However, we have found that in all cases, especially when preparing catalysts for olefin polymerization, a second activation results in a catalyst of greater activity, and such a procedure may be followed when for some reason a catalyst of low activity results after only one activation treatment. The increase of activity following each subsequent activation treatment becomes less, so that it is not desirable to perform more than two or three activations. The granular silica gel may be stirred or agitated during any or all of the hereinbefore described washing and activating steps, but we have found that satisfactory results may be obtained at less cost without any such agitation.

The following data illustrate some of the advantages to be obtained by our invention when applied to the preparation of several batches of a silica-alumina catalyst for polymerization of olefins. Method A is the preparative method disclosed herein, including both of the improved washing steps and the improved activating step. Method B is a method representative of the prior art discussed herein, wherein neither recirculation of wash water nor of the activation solution was used. The activity indicated corresponds to the cubic centimeters of polymer produced in a four-hour test period when propylene is passed over a standard test portion of the catalyst under standardized conditions of flow rate, temperature, and pressure.

*Activity*

| Method of preparing catalyst | One activation | | | Two activations | | |
|---|---|---|---|---|---|---|
| | Avg. | Max. | Min. | Avg. | Max. | Min. |
| A. (34 batches) | 5.03 | 7.0 | 1.8 | 7.48 | 9.0 | 4.5 |
| B. (21 batches) | 2.8 | 6.5 | 0.8 | 3.37 | 6.0 | 1.6 |

Similar improvements can be obtained when preparing catalysts of the silica-alumina type by the use of salts of one or more other metals of groups III-B and IV-A of the periodic system, as hereinbefore disclosed.

While the tests by which such activities are determined have considerable value in evaluating catalytic activity, they do not necessarily represent an ordinary hydrocarbon conversion process, or even an ordinary olefin polymerization process, as to possible charge stock or operating temperature, or the like. It has been found by repeated comparative tests and runs that a catalyst which has a good activity in such a test will have a good activity in various processes, although under considerably different operating conditions.

Various modifications of catalyst preparation have been disclosed herein, and the effects of changing various factors have been described. While a preferred procedure has been outlined in detail, it is, of course, understood that various modifications may be applied in any particular case in the light of the present disclosure without going outside the teachings, or spirit, of the invention.

Reference is made to our copending application Serial No. 511,184, filed November 20, 1943, in which is claimed subject matter disclosed but not claimed herein.

We claim:

1. In the preparation of a catalytic material of the silica-alumina type, the improvement in at least one of the washing procedures to which the hydrous silica gel is subjected, which comprises washing such a silica gel with a stream of water, discarding a portion of the effluent of said washing and returning a further portion of said effluent to said hydrous silica gel in admixture with fresh wash water, and discontinuing said treatment while the pH of said effluent is less than 7.0.

2. In the preparation of a catalytic material of the silica-alumina type, the improvement which comprises washing a partially dried hydrous silica gel with a stream of water, discarding a portion of the effluent of said washing and returning a further portion of said effluent to said silica gel in admixture with fresh wash water, treating the resultant washed silica gel with an aqueous solution of a hydrolyzable salt of a metal selected from groups III-B and IV-A of the periodic system, washing said treated gel, and subsequently drying said treated and washed gel.

3. In the preparation of a catalytic material of the silica-alumina type, the improvement which comprises treating a partially dried hydrous silica gel with an aqueous solution of a hydrolyzable salt of a metal selected from groups III-B and IV-A of the periodic system, subsequently washing said treated gel with a stream of water, discarding a portion of the effluent of said washing and returning a further portion of said effluent to said treated silica gel in admixture with fresh wash water, discontinuing said washing while the pH of the effluent wash water is between about 3.0 and 7.0, and drying the resultant material.

4. In the preparation of a catalytic material of the silica-alumina type, the improvement which comprises washing a partially dried hydrous silica gel with a stream of water, discarding a portion of the effluent of said washing and returning a further portion of said effluent to said silica gel in admixture with fresh wash water, discontinuing the washing while the pH of the effluent is less than 7.0, treating the resultant washed silica gel with an aqueous solution of a hydrolyzable salt of a metal selected from groups III-B and IV-A of the periodic system, subsequently washing said treated gel with a stream of water, discarding a portion of the effluent of said washing and returning a further portion of said effluent to said treated silica gel in admixture with fresh wash water, discontinuing said washing while the pH of the effluent is less than 7.0, and drying the resultant material.

5. An improved process for the preparation of a catalyst of the silica-alumina type, which comprises preparing a hydrous silica gel, washing said gel free of excess acid and partially drying the same, washing said partially dried gel with a stream of water, discarding a portion of the effluent of said washing and returning a further portion of said effluent to said washing in admixture with fresh wash water, treating the resultant washed silica gel with an aqueous solution of a hydrolyzable salt of a metal selected from groups III-B and IV-A of the periodic system, passing said solution repeatedly into and out of contact with said silica gel during said treatment, subsequently washing said treated gel with a stream of water, discarding a portion of the effluent of said washing and returning a further portion of said effluent to said washing in admixture with fresh water, and subsequently drying said treated and washed gel.

6. An improved process for the preparation of a catalyst of the silica-alumina type, which comprises adding an aqueous alkali-metal silicate to a dilute aqueous mineral acid to form a hydrous acidic gel of silica, partially drying said hydrous gel, washing the partially dried gel with a stream of water, recirculating a portion of the effluent wash water during said washing and adding fresh water to the washing system such that the amount of fresh water added is between about 0.25 and 2.5 volumes per volume of gel per hour and the ratio of recirculated water to fresh water is between 1 to 1 and 10 to 1, discontinuing said washing while the pH of said effluent is between 2.5 and 5.0, treating said washed gel with a stream of an aqueous solution of a hydrolyzable salt of a metal selected from groups III-B and IV-A of the periodic system, and recirculating during said treatment at least a portion of the effluent stream of said salt solution, subjecting said treated gel to a second washing with recirculation of a portion of the effluent wash water and additon of fresh wash water as in the first said washing, discontinuing said washing while the pH of said effluent is between about 3 and 5, and drying the resultant material.

7. An improved process for the preparation of a silica-alumina catalyst, which comprises adding an aqueous alkali-metal silicate to dilute aqueous sulfuric acid to form a hydrous acidic gel of silica, partially drying said hydrous gel, washing the partially dried gel with a stream of water, recirculating a portion of the effluent wash water during said washing, discontinuing said washing while the pH of said effluent is between about 2.6 and 3.5, treating said washed gel with a stream of an aqueous solution of aluminum sulfate and recirculating during said treatment at least a portion of the effluent stream of said aluminum sulfate solution, subjecting said treated gel to a second washing with a stream of water, recirculating a portion of the effluent wash water during said washing, discontinuing said washing while the pH of said effluent is between about 3.0 and 4.0, and drying the resultant material.

HURSHEL V. HENDRIX.
CHARLES C. CHAPMAN.